United States Patent
Kanehara et al.

(10) Patent No.: US 9,761,213 B2
(45) Date of Patent: Sep. 12, 2017

(54) ACCELERATION SOUND GENERATION DEVICE FOR VEHICLE

(71) Applicant: Nissan Motor Co., Ltd., Yokohama, Kanagawa (JP)

(72) Inventors: Shunichi Kanehara, Yamato (JP); Wataru Ogose, Fujisawa (JP); Koji Shionome, Yamato (JP)

(73) Assignee: Nissan Motor Co., Ltd., Yokohama (JP)

( * ) Notice: Subject to any disclaimer, the term of this patent is extended or adjusted under 35 U.S.C. 154(b) by 131 days.

(21) Appl. No.: 14/351,187

(22) PCT Filed: Dec. 11, 2012

(86) PCT No.: PCT/JP2012/082023
§ 371 (c)(1),
(2) Date: Apr. 11, 2014

(87) PCT Pub. No.: WO2013/094467
PCT Pub. Date: Jun. 27, 2013

(65) Prior Publication Data
US 2014/0233745 A1    Aug. 21, 2014

(30) Foreign Application Priority Data

Dec. 22, 2011   (JP) .................................. 2011-281225

(51) Int. Cl.
  *H04B 1/00*    (2006.01)
  *G10H 5/02*    (2006.01)
  (Continued)

(52) U.S. Cl.
  CPC ............... *G10H 5/02* (2013.01); *B60L 15/20* (2013.01); *G10K 15/02* (2013.01);
  (Continued)

(58) Field of Classification Search
  None
  See application file for complete search history.

(56) References Cited

U.S. PATENT DOCUMENTS 5,835,605 A    11/1998  Kunimoto
2008/0310642 A1  12/2008  Sakamoto et al.
(Continued)

FOREIGN PATENT DOCUMENTS

JP    8-152894 A    6/1996
JP    2005-134885 A  5/2005
(Continued)

*Primary Examiner* — Joseph Saunders, Jr.
*Assistant Examiner* — James Mooney
(74) *Attorney, Agent, or Firm* — Global IP Counselors, LLP (57) ABSTRACT

An acceleration sound generation device for a vehicle using at least one of an acceleration operation of the vehicle, an acceleration force generated by the acceleration operation, and an acceleration state obtained by the acceleration force as a control parameter. The acceleration sound generation device includes a sound generation unit and an acceleration sound delay unit. The sound generation unit generates an acceleration sound in a vehicle passenger compartment in response to an acceleration sound signal that is generated based on the control parameter. The acceleration sound delay unit delays output of the acceleration sound by the sound generation unit such that the acceleration sound changes and is delayed with respect to a change in the control parameter. The acceleration sound delay unit sets a delay degree of the acceleration sound at a rising time of the control parameter separately from at a falling time of the control parameter.

20 Claims, 8 Drawing Sheets (51) Int. Cl.
  *G10K 15/02* (2006.01)
  *B60L 15/20* (2006.01)
(52) U.S. Cl.
  CPC ....... *B60L 2240/12* (2013.01); *B60L 2240/16* (2013.01); *B60L 2240/423* (2013.01); *B60L 2240/80* (2013.01); *B60L 2250/26* (2013.01); *B60L 2270/42* (2013.01); *Y02T 10/645* (2013.01); *Y02T 10/72* (2013.01); *Y02T 10/7275* (2013.01)

(56) References Cited

U.S. PATENT DOCUMENTS

2011/0010269 A1* 1/2011 Ballard ................ B60Q 5/008
                                                        705/26.41
2012/0177214 A1* 7/2012 Hera ...................... G10K 15/02
                                                        381/73.1

FOREIGN PATENT DOCUMENTS

| JP | 2006-298111 A | 11/2006 |
| JP | 2007-126984 A | 5/2007 |
| JP | 2008-25492 A | 2/2008 |
| JP | 2008-96487 A | 4/2008 |
| JP | 2008-145659 A | 6/2008 |
| JP | 2008-213760 A | 9/2008 |
| JP | 2009-31428 A | 2/2009 |

* cited by examiner

ACCELERATION SOUND GENERATION DEVICE FOR VEHICLE

CROSS-REFERENCE TO RELATED APPLICATIONS

This application is a U.S. National stage application of International Application No. PCT/JP2012/082023, filed Dec. 11, 2012, which claims priority to Japanese Patent Application No. 2011-281225 filed in Japan on Dec. 22, 2011, the contents of which are hereby incorporated herein by reference.

BACKGROUND

Field of the Invention

The present invention relates to an acceleration sound generation device for a vehicle which is configured to generate an acceleration sound by using at least one of an acceleration operation of the vehicle, an acceleration force generated by this acceleration operation, and an acceleration state obtained by this acceleration force as a control parameter and by causing a sound generation unit to respond to an acceleration sound signal generated on the basis of the control parameter so as to generate the acceleration sound.

Background Information

In a vehicle which is powered by an engine such as an internal combustion engine, it may be necessary to increase the commercial value of the vehicle by the effect of the engine sound. In this case, an acceleration operation of a vehicle, an acceleration force generated by the acceleration operation, an acceleration state obtained by this acceleration force, and the like is used as a control parameter. The acceleration sound will then be generated on the basis of this control parameter.

Conventionally, as an acceleration generation device for the purpose of presenting the effect of the engine sound, such a technique described in Japanese Patent Application Publication No. 2007-126984, for example, is proposed. In the proposed technique, by adding a sound generated by an engine rotation speed and an accelerator opening to the engine sound, a vehicle compartment sound is intended to be the sound of a frequency lower than the fundamental-order frequency of the engine.

SUMMARY

However, since the sound to be added in the proposed prior art is generated by directly using the accelerator opening degree, when subject to sudden acceleration operation, additional sound is suddenly changed in response thereto such that the sudden change would not match or conform to an actual vehicle driving state to thereby give a sense of discomfort to the passenger.

The present invention has been created in view of the situation in the conventional technique and aims to provide an acceleration sound generation device for a vehicle, which is free from the problem regarding the above described discomfort by preventing the acceleration sound (volume and pitch) from being subject to sudden change even at a sudden acceleration of the vehicle.

To this end, the acceleration sound generation device for a vehicle according to the present invention is configured in the following manner. The acceleration sound generation device for a vehicle representative of the premise uses at least one of an acceleration operation of the vehicle, an acceleration force generated by the acceleration operation, and the acceleration state obtained by the acceleration force as a control parameter, and cause a sound generation unit to respond to the acceleration sound signal created on the basis of the control parameter so as to generate an acceleration sound in a vehicle compartment.

The present invention is characterized in providing an acceleration sound delay unit on the acceleration sound generation device of the vehicle described above such that the acceleration sound varies with a delay with respect to change in the control parameter.

In the acceleration sound generation device according the present invention, since the acceleration sound varies with a delay with respect to change in the control parameter, even at a sudden or rapid acceleration of the vehicle in which the control parameter is subject to sudden change, the acceleration sound will be prevented from being subject to abrupt change so that the discomfort due to a sudden change in the acceleration sound may be avoided.

BRIEF DESCRIPTION OF THE DRAWINGS

Referring now to the attached drawings which form a part of this original disclosure.

DETAILED DESCRIPTION OF THE EMBODIMENTS

The embodiments according to the present invention will now be described below with reference to the accompanying drawings.

First Embodiment

Acceleration Sound Generation Device of First Embodiment

Figure 1:
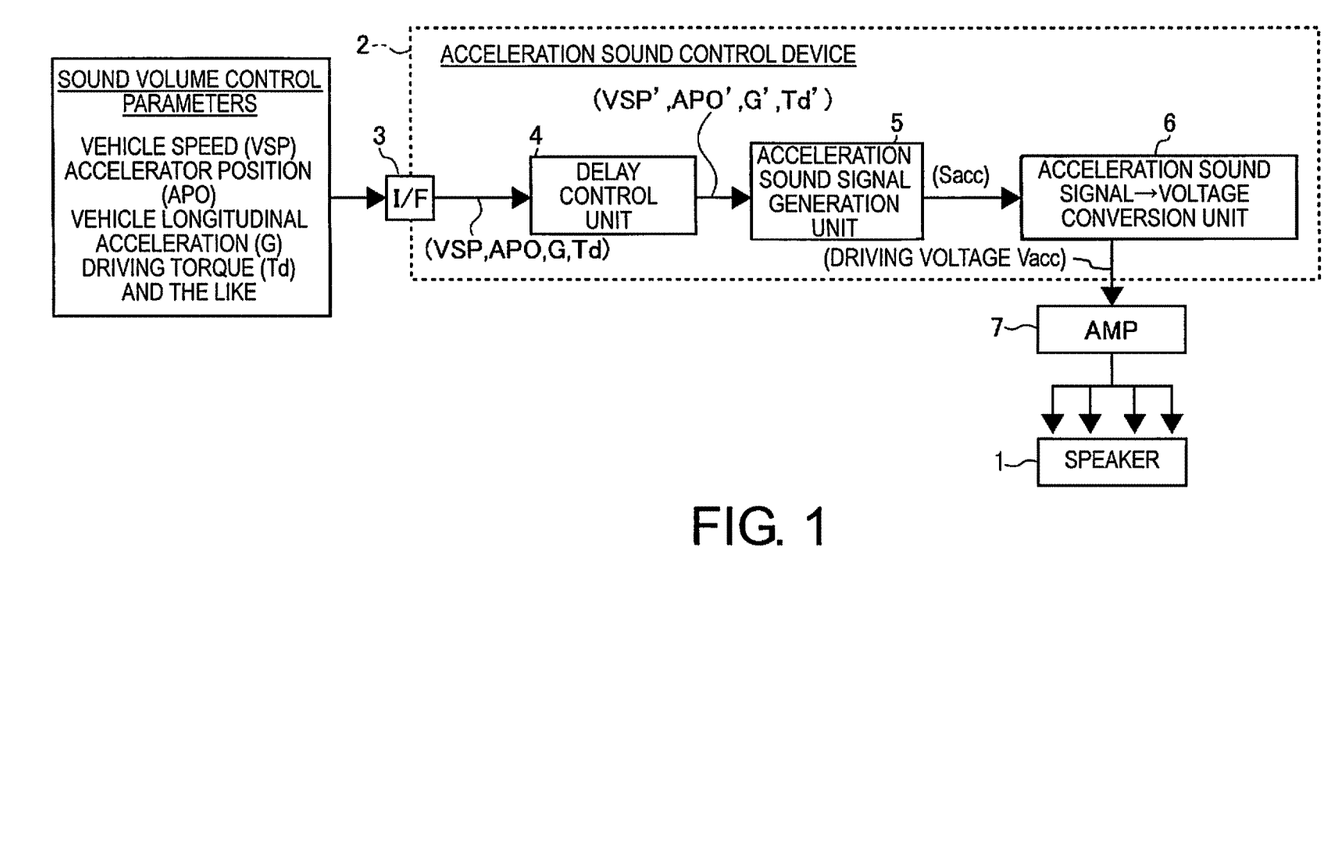
FIG. 1 is a drive control system diagram of a vehicle compartment loudspeaker showing an acceleration sound generation device for a vehicle pertaining to a first embodiment according to the present invention.

FIG. 1 shows the acceleration sound generation device for a vehicle pertaining to a first exemplary embodiment according to the present invention, and particularly illustrates a control system diagram for an in-vehicle speaker representing a sound generation unit for generating an acceleration sound in a vehicle passenger compartment.

Note that the vehicle to which the acceleration sound generation device in the present embodiment shown in FIG. 1 is applied is not illustrated, but is configured to be a vehicle whose wheels are driven by an electric motor for travel or propulsion. The acceleration sound generation device is intended to generate an acceleration sound in the vehicle compartment with a view to directing to the passenger to feel a sense of acceleration.

In FIG. 1, an acceleration sound control device is denoted by reference numeral 2 for generating a drive signal of the in-vehicle speaker 1. The device 2 is intended to control a sound volume level of the acceleration sound generated by the in-vehicle speaker 1 to correspond to the acceleration degree of the vehicle. Needless to say, instead of controlling the sound volume level to correspond to the acceleration degree of the vehicle, the acceleration sound may be controlled by way of pitch and others to correspond to the acceleration degree of the vehicle so as to direct the feel of acceleration. However, in the descriptions below, a case is selected and developed in which the sound volume level of the acceleration sound is controlled in accordance with the acceleration degree of a vehicle.

The acceleration sound control device 2 comprises an interface (I/F) 3, a delay control unit 4 (corresponding to the acceleration sound delay unit according to the present invention), an acceleration sound signal generation unit 5, and an acceleration sound signal→voltage conversion unit 6. The acceleration sound control device 2 uses an accelerator opening APO indicating an acceleration operation, a driving torque (acceleration force) Td generated by the acceleration operation, and a vehicle speed VSP and a vehicle longitudinal acceleration G obtained by the driving torque as a sound volume control parameter and receives these sound volume control parameters (APO, Td, VSP, G and the like) from the interface (I/F) 3.

These sound volume control parameters (APO, Td, VSP, G and the like) may be actual values or calculated ones. One example is shown as representative by the broken line in FIG. 2. The sound volume control parameter exhibits such a time series variations such that it rises in accordance with an acceleration operation due to an accelerator pedal depression and falls in accordance with the completion of the acceleration operation due to release (back) operation of the accelerator pedal.

Figure 2:
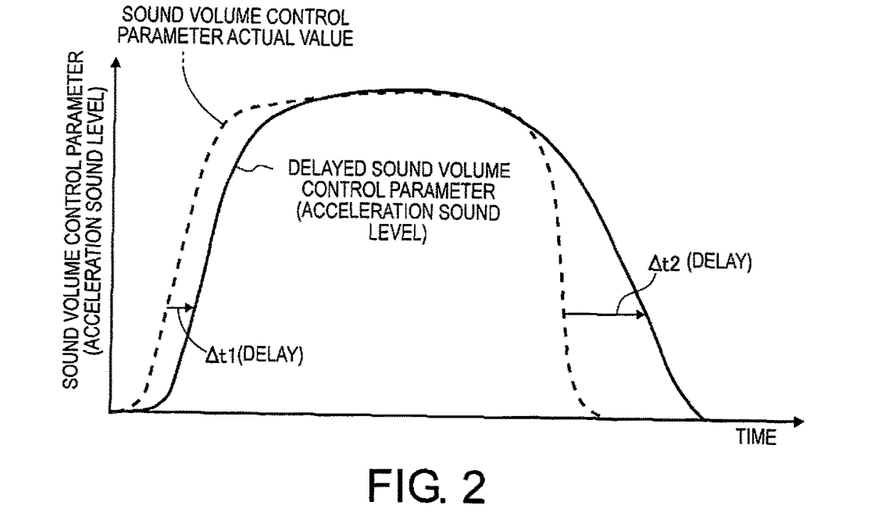
FIG. 2 is a time chart illustrating a time series variation in an acceleration sound level control parameter FIG. 1 comparing those before and after the delay caused by a delay control unit for delaying the acceleration sound level control parameter.

As shown by the solid line in FIG. 2, the delay control unit 4 causes the sound volume control parameters (APO, Td, VSP, G and the like) taken from the interface (I/F) 3 to delay by Δt1 at a rising time and to delay by Δt2 at a falling time, respectively, and introduces the delayed sound volume control parameters (APO', Td', VSP', G' and the like) to an acceleration sound signal generation unit 5.

Note that, when the volume control parameters (APO, Td, VSP, G and the like) shown by the solid line in the figure are being delayed by the delay control unit 4 as indicated by a broken line in FIG. 2, the delayed a volume control parameter (APO', Td', VSP', G' and the like) may be obtained by subjecting the change in sound volume parameters (APO, Td, VSP or G) to a second order delay, or by taking a moving average of the sound volume control parameters (APO, Td, VSP, G and the like).

Instead, the delay control unit 4 may be configured to delay the volume control parameters (APO, Td, VSP, G and the like) in the following manner. That is, as indicated by a chain line in FIG. 3, it is possible to preset a rising gradient limit line α at the rising side of the volume control parameters (APO, Td, VSP, G and the like) and a falling gradient limit line β at the falling side thereof, and to translate subsequently these gradient limit lines α and β so as to assume predetermined delay degrees Δt1 and Δt2 as shown the two-dot chain lines. Thus, the delayed sound volume control parameters (APO', Td', VSP', G' and the like) may be obtained as shown by a solid line in the figure based on the gradient limit lines α and β and the volume control parameter indications (APO, Td, VSP, G and the like) located between these translated gradient limit lines α and β.

Note that, when obtaining the delayed volume control parameters (APO', Td', VSP', G' and the like), the delaying manner of the volume control parameters described above (APO, Td, VSP, G and the like) may be selected to combine arbitrarily at the rising side of and at the falling side of the volume control parameters (APO, Td, VSP, G and the like) as listed below as example combinations.

(a) The volume control parameter (APO, Td, VSP, G and the like) is delayed by the moving average at the rising side, and is delayed based on the falling gradient limit line β at the falling side.

(b) The volume control parameter (APO, Td, VSP, G and the like) is delayed based at the rising gradient limit line α on the rising side and is delayed by the moving average at the falling side.

(c) The volume control parameter (APO, Td, VSP, G and the like) is delayed by the moving average on the rising side, and is delayed by the secondary order delay at the falling side.

(d) The volume control parameter (APO, Td, VSP, G and the like) is delayed by the secondary order delay at the rising side, and is delayed by the moving average at the falling side.

(e) The volume control parameter (APO, Td, VSP, G and the like) is delayed on the basis of the rising gradient limit line α at the rising side, and is delayed by a secondary order delay at the falling side.

(f) The volume control parameter (APO, Td, VSP, G and the like) is delayed by secondary order delay at the rising side, and is delayed based on the gradient limit line β at the falling side.

Figure 3:
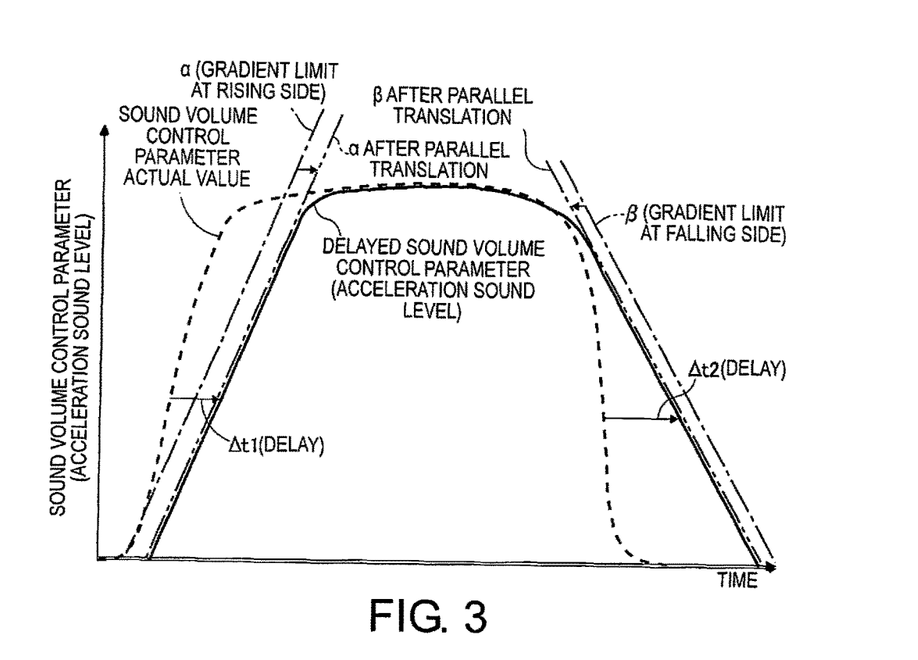
FIG. 3 is a time chart similar to FIG. 2 illustrating another delay mode of the acceleration sound level control parameter by the delay control unit in FIG. 1.

In any case, however, when delaying the volume control parameters shown by broken lines in FIGS. 2 and 3 by the delay control unit 4 as shown by the solid lines in FIGS. 2 and 3, it is preferable to set the delay time Δt1 at the rising side and the delay time Δt2 at the falling side individually and separately. It is more preferable to set such that the relationship Δt1<Δt2 is established, so that, as shown by the delay degrees of the acceleration sound by solid lines in FIGS. 2 and 3, the delay time at the rising side of the volume control parameter is smaller than that at the falling side of the control parameter.

Figure 4:
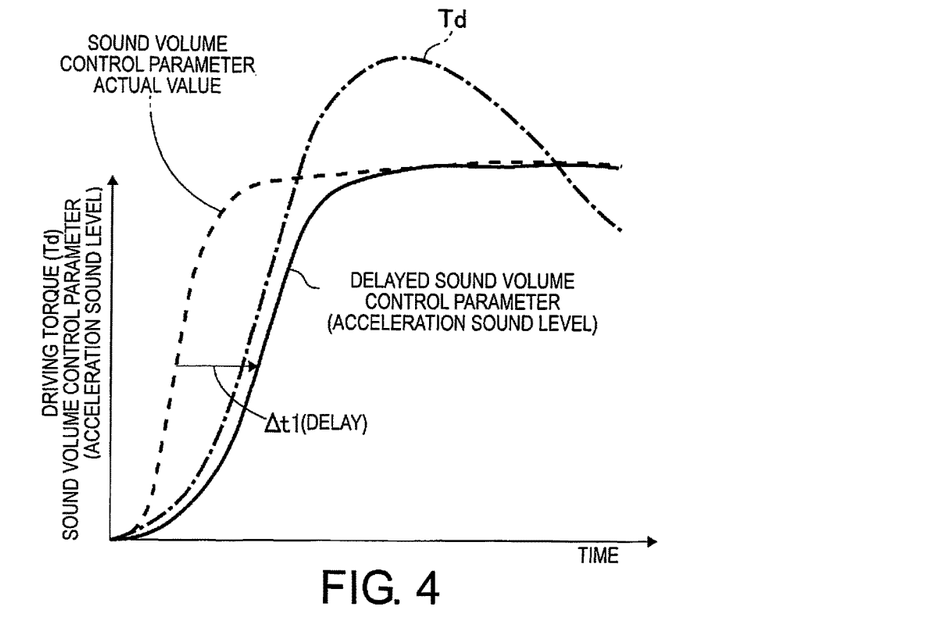
FIG. 4 is a time chart similar to FIG. 2 showing still another delay mode of the acceleration sound level control parameter by the delay control unit in FIG. 1.
Figure 5:
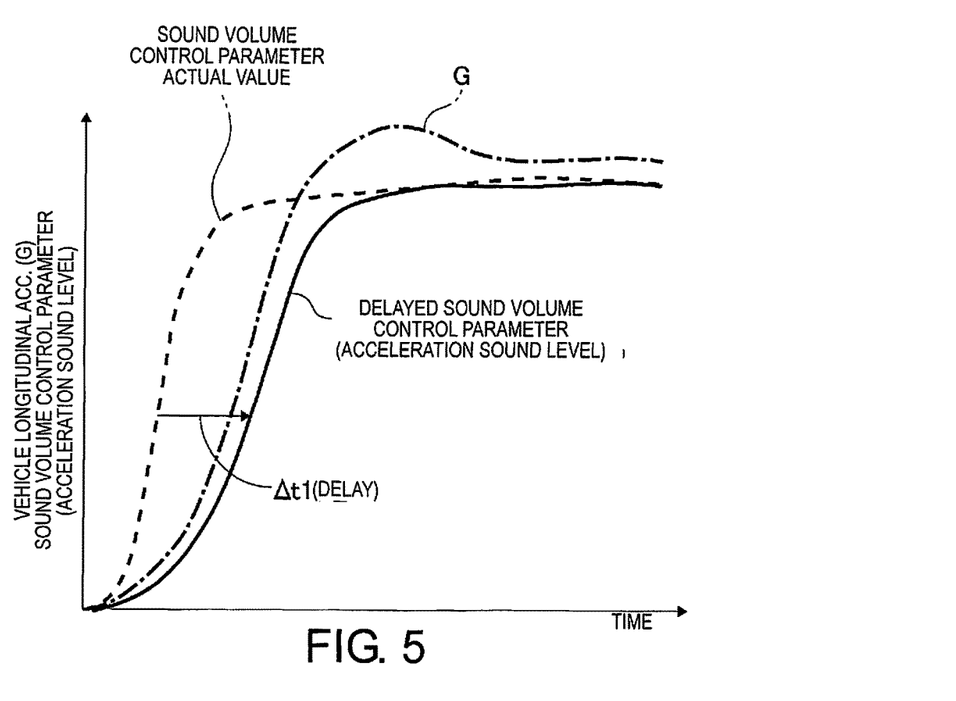
FIG. 5 is a time chart similar to FIG. 2 showing yet another delay mode of the acceleration sound level control parameter by the delay control unit in FIG. 1.

Further, it is preferable to delay the volume control parameter (APO, Td, VSP, G and the like) in a manner shown in FIGS. 4, and 5. That is, it is desirable, by setting the delay degree Δt1 in the acceleration sound shown by a solid line in FIGS. 4 and 5 with respect to the volume control parameter (corresponding to an acceleration operation) shown by broken lines in FIGS. 4 and 5 to match a response delay of the drive torque (acceleration force) Td or the vehicle longitudinal acceleration (acceleration state) G shown by chain line with respect to the volume control parameter (corresponding to the acceleration operation) to obtain the delayed volume control parameters (APO', Td', VSP', G' and the like). In FIGS. 4 and 5, the setting is shown only for the rising side of the volume control parameters, it is preferable as a matter of course to set the similar delay mode at the falling side of the volume control parameter as well.

The acceleration sound signal generation unit 5 in FIG. 1 generates an acceleration sound signal Sacc based on the delayed volume control parameter (APO', Td', VSP', G' and the like) described above. The acceleration sound signal Sacc represents a signal that depends on the acceleration degree of the vehicle, and is raised as the acceleration degree increases as shown by the acceleration sound level from the speaker 1 by solid line in FIG. 2 (for convenience, shown at the same level as the delayed volume control parameter).

The acceleration sound signal→voltage conversion unit 6 converts the acceleration sound signal from Sacc from the acceleration sound signal generation unit 5 into a speaker drive voltage Vacc to supply to the amplifier (AMP) 7. The amplifier (AMP) 7 amplifies the speaker drive voltage Vacc to a level enabling the drive of the speaker 1 to apply on the speaker 1. The speaker 1 in turn outputs in the vehicle passenger compartment the acceleration sound at a level shown by solid line in FIG. 2, which corresponds to the acceleration sound signal Sacc.

Effect of First Embodiment

According to the acceleration sound generation device in the first embodiment described above, a delayed volume control parameter (APO', Td', VSP', G' and the like) is obtained by delaying the volume control parameter (APO, Td, VSP, G and the like) at the delay control unit 4 from the broken line to the solid line as described above in FIGS. 2 to 5, and the speaker 1 is caused to respond to an acceleration sound signal Sacc generated on the basis thereof to generate an acceleration sound in the vehicle compartment. Thus, as shown by the solid line in FIGS. 2 to 5, the volume control parameter (APO, Td, VSP, G and the like) shown by broken line is configured to undergo a level change in delay so that, even during rapid acceleration of the vehicle in which the volume control parameter (APO, Td, VSP, G and the like) changes rapidly, an acceleration sound will not changes along therewith so that the discomfort due to a rapid change in the acceleration sound may be avoided.

Further, since the above-mentioned effects may be obtained by delaying the volume control parameter (APO, Td, VSP, G and the like) by the delay control unit 4, an additional calculation unit specific for the delay operation is not required in the acceleration sound signal generation unit 5 and the acceleration sound signal generation unit 5 will be prevented from being costly and may enjoy cost benefit.

Further, when delaying the volume control parameter (APO, Td, VSP, G and the like) shown by broken line in FIGS. 2, 3 by the delay control unit 4 so as to be represented by solid line in FIGS. 2, 3, since the delay time Δt1 of the rising side and the delay time Δt2 delay time of the falling side may be set individually, even the modes of time series variation of the volume control parameter (APO, Td, VSP, G and the like) are different at the rising side and the falling side, by separately or individually setting the delay time Δt1, Δt2, the effects described above may be demonstrated even more strikingly.

It should be noted that, at the time of setting the time delay Δt1 at the rising side and the time delay Δt2 at the falling side individually, the delay degrees are set to meet the relationship, Δt1<Δt2. Thus, with respect to the volume control parameter (APO, Td, VSP, G and the like) shown by broken line, the delay degree at the rising side of the volume control parameter (APO, Td, VSP, G and the like) will be set smaller than at the falling side of the volume control parameter (APO, Td, VSP, G and the like). Consequently, following effects may be achieved.

Normally, compared at the time of an accelerator pedal release, at the time of accelerator depression, the response of the conventional accelerator pedal is more weakening. Thus, if the delay degree of the volume control parameter (APO, Td, VSP, G and the like) would be set greater at the falling side than at the rising side, combined with the weakening accelerator pedal response at the accelerator pedal depression, the acceleration sound will be excessively delayed to thereby imparting a sense of discomfort. However, in the present embodiment, since the delay degree is set smaller at the rising side of the volume control parameter (APO, Td, VSP, G and the like) than at the falling side of the volume control parameter (APO, Td, VSP, G and the like), the problem of the discomfort associated with excessive delay of the acceleration sound may be avoided.

Moreover, in the present embodiment, as described above per FIGS. 4, 5, the delay degree of the acceleration sound with respect to the sound volume parameter (corresponding to the acceleration operation) is configured to match a response delay of a drive torque (acceleration force) Td or a vehicle longitudinal acceleration (acceleration state) G when delaying the volume control parameters (APO, Td, VSP, G and the like) to obtain the delayed volume control parameter (APO', Td', VSP', and G). Therefore, whatever response delay the drive torque (acceleration force) Td or the vehicle longitudinal acceleration (acceleration state) may exhibit, the acceleration sound may be delayed appropriately reflecting the actual situation. Therefore, during rapid vehicle acceleration, the acceleration sound is prevented from changing rapidly, far from the actual acceleration so that the effect describe above is more conspicuously demonstrated and the sense of discomfort due to rapid change in acceleration sound may be avoided.

Second Embodiment

Acceleration Sound Generation Device of Second Embodiment

Figure 6:
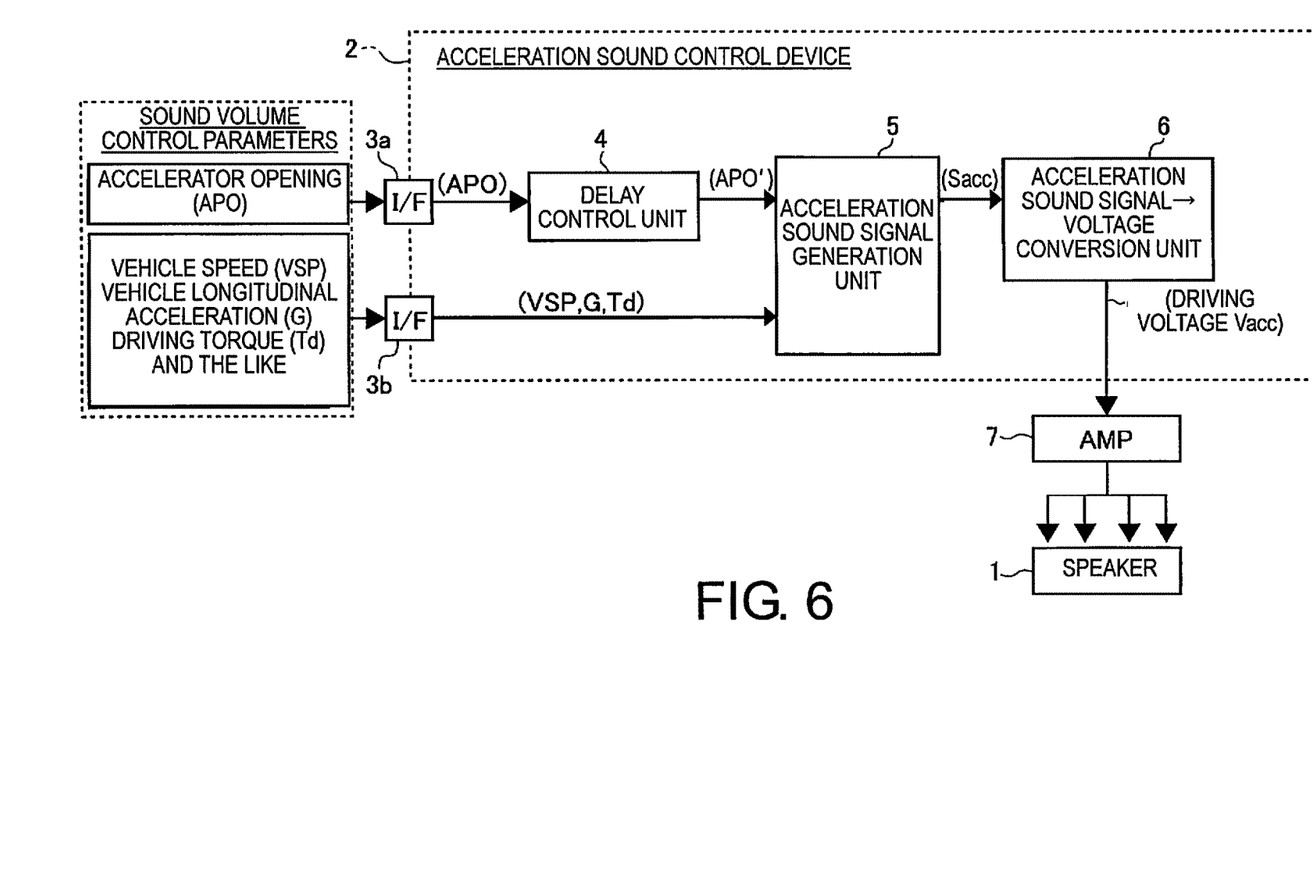
FIG. 6 is a drive control system diagram for an in-vehicle loudspeaker showing a second embodiment of an acceleration sound generation device for a vehicle in a second embodiment according to the present invention.

FIG. 6 shows an acceleration sound generation device for a vehicle in a second embodiment according to the present invention and illustrates a control system diagram for an in-vehicle speaker 1 similar to FIG. 1, where the speaker 1 serves to add an acceleration sound in a vehicle passenger compartment for the purpose of production of acceleration feeling.

In FIG. 6, for those parts that function similarly as in FIG. 1, the same reference numerals are attached and a detailed description thereof will be omitted. Also in the present embodiment, the acceleration sound control device 2 controls the volume level of an acceleration sound generated by the in-vehicle speaker 1 and comprises the delay control unit 4 (corresponding to the acceleration sound delay unit according to the present invention) and the acceleration sound signal generation unit 5, and the acceleration sound signal→voltage converter 6. However, as an interface (I/F), two interfaces 3a, 3b are provided.

Similarly to that in FIG. 1, the acceleration sound control device 2 uses an accelerator pedal opening APO representing an acceleration operation of the vehicle, a drive torque generated by the acceleration operation (acceleration force) Td, and a vehicle speed or vehicle longitudinal acceleration G obtained by the drive torque as a volume control parameter. However, the accelerator pedal opening APO is received at a dedicated interface (I/F) 3a into the acceleration control device 2 while the other parameters, i.e., the drive torque (acceleration force) Td, the vehicle speed VSP, and the vehicle longitudinal acceleration G may be received at the other interface (I/F) 3b into the acceleration sound control device 2.

These volume control parameters (APO, Td, VSP, G and the like) are either actual values or calculated values. One representative parameter is illustrated in FIG. 2 by broken line which rises in accordance with the accelerator pedal depression and falls along with the completion of the acceleration operation due to release (return) of the accelerator pedal depression.

In the present embodiment, the delay control unit 4 is interposed only between the interface (I/F) 3a and the acceleration signal generation unit 5 and the delaying operation by the delay control unit 4 is applied only to the accelerator pedal opening APO among the volume control parameters (APO, Td, VSP, G and the like). Thus, the delayed accelerator pedal opening APO' shown by solid line in FIG. 2 in caused to be incorporated in the acceleration sound signal generation unit 5.

Then, due to a direct connection between the interface (I/F) 3b ant the acceleration sound signal generation unit 5, the parameters other than the accelerator pedal opening APO among the volume control parameters (APO, Td, VSP, G and the like), i.e., the drive torque (acceleration force) Td, the vehicle speed VSP and the vehicle longitudinal acceleration G are directly (i.e., as in the actual value or calculated value shown by broken line in FIG. 2) incorporated into the acceleration sound signal generation unit 5 without performing a delaying operation.

The delay control unit 4 delays the volume control parameter (the accelerator pedal opening shown by broken line in FIG. 2) taken from the interface (I/F) 3a, in the same manner as has been described in the first embodiment, to obtain the solid line so that the volume control parameter is delayed by $\Delta t1$ at the rising side and by $\Delta t2$ at the falling side, respectively and the delayed accelerator opening APO' is supplied to the acceleration sound signal generation unit 5 as the delayed volume control parameter.

Note that, when delaying the volume control parameter (the accelerator opening APO) by the delay control unit 4, as shown by solid line in the figure, the delayed volume control parameter (accelerator opening APO') that varies in a secondary order delay with respect to change in the volume control parameter (accelerator opening APO) may be effectively obtained. Further, the delayed volume control parameter (accelerator pedal opening APO') may be obtained by applying a moving average of the volume control parameter (accelerator pedal opening APO). Alternatively, as described with reference to FIG. 3, the delayed volume control parameter (accelerator pedal opening APO') may be obtained by delaying the volume control parameter (accelerator pedal opening APO) using both a gradient limit line α at the rising side and a gradient limit line β at the falling side.

Figure 7:
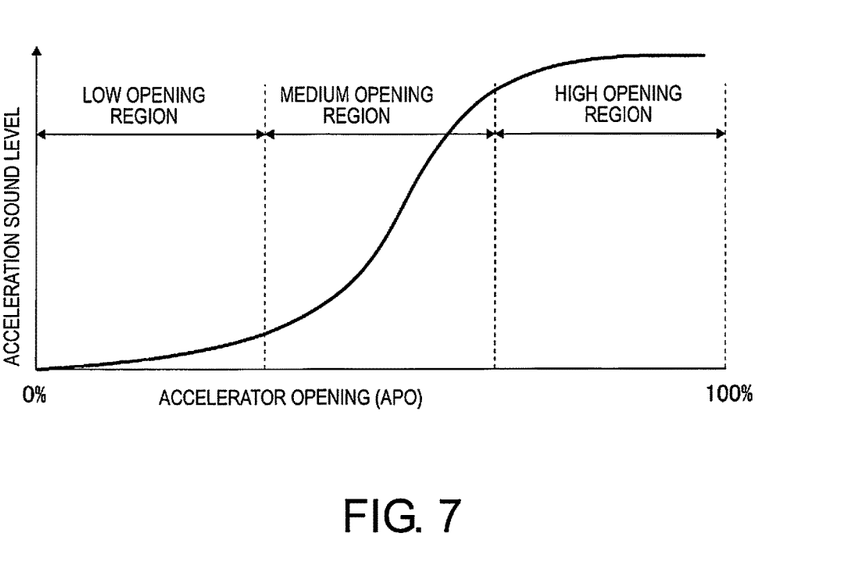
FIG. 7 is a characteristic diagram showing the relationship between the acceleration sound level obtained by the delay of the acceleration sound level control parameter according to the delay control unit in FIG. 6 and the accelerator opening.

However, in any case, in the present embodiment, the volume control parameter (accelerator pedal opening APO) is delayed such that the acceleration sound level varies as illustrated in FIG. 7 with respect to the accelerator pedal opening APO. That is, in the low opening degree range or region with a small accelerator pedal opening APO, the volume control parameter (accelerator pedal opening APO) is delayed such that the change rate of the acceleration sound level with respect to the accelerator pedal operation (acceleration operation) is small. Further, in an intermediate opening region in which the accelerator pedal opening APO is larger, the volume control parameter (accelerator pedal opening APO) is delayed such that the change rate of the acceleration sound level with respect to the accelerator pedal operation (acceleration operation) is large. Furthermore, in a high opening region in which the accelerator pedal opening APO is even more larger, the volume control parameter (accelerator pedal opening APO) is delayed such that the change rate of the acceleration sound level with respect to the accelerator pedal operation (acceleration operation) will be small.

Moreover, in this connection, in the present embodiment, when delaying the volume control parameter (accelerator pedal opening APO) shown by the broken line in FIGS. 2 and 3 by the delay control unit 4 to obtain the solid line shown by the solid line in FIGS. 2 and 3, the delay time $\Delta t1$ at the rising side is differentiated from the delay time $\Delta t2$ to assume the relationship, $\Delta t1 < \Delta t2$, so that the delay degree of the acceleration sound is, as indicated by the solid line in FIGS. 2 and 3, set smaller at the rising side of the volume control parameter than at the falling side.

The acceleration sound signal generation unit 5 shown in FIG. 6 generates an acceleration sound signal Sacc based on the delayed volume control parameter (accelerator pedal opening APO) and the other, non-delayed, volume control parameters (Td, VSP, G and the like). The acceleration sound signal Sacc represents a signal that increases the acceleration sound level from the speaker 1 in accordance with the vehicle acceleration degree as shown by solid line in FIG. 2 (for convenience, shown at the same level as the delayed volume control parameter).

The acceleration sound signal→voltage conversion unit or converter 6 converts the acceleration sound signal Sacc from the acceleration sound signal generation unit 5 into a speaker driving voltage Vacc to supply to an amplifier (AMP) 7. The amplifier (AMP) 7 amplifies the speaker driving voltage Vacc to a level enabling to drive the speaker 1 and applies the amplified voltage to the speaker 1. The speaker 1 outputs an acceleration sound in the vehicle passenger compartment at the level shown by the solid line in FIG. 2, which corresponds to the acceleration sound signal Sacc.

The Effect of Second Embodiment

According to the acceleration sound generation device pertaining to the second embodiment described above, at the delay control unit 4, one of the volume control parameters (accelerator pedal opening APO) is delayed to obtain a delayed volume control parameter (APO') by delaying from the broken line to the solid line, as described above in FIGS. 2 and 3. Based on this and the other, non-delayed volume control parameters (Td, VSP, and G), an acceleration sound signal Sacc is generated and the speaker 1 is caused to respond thereto to thereby generate an acceleration sound in the vehicle passenger compartment. Thus, the acceleration sound undergoes a level change with delay as shown by a solid line in FIGS. 2 and 3 from the volume control parameter (APO, Td, VSP, G and the like) shown by broken line so that, at a rapid vehicle acceleration where the volume control parameter (APO, Td, VSP, G and the like) changes rapidly, the acceleration sound is prevented from being abrupt change to thereby alleviate a sense of discomfort due to a rapid change in the acceleration sound.

Further, the above described effect may be achieved by delaying in particular only the accelerator pedal opening APO at the delay control unit 4 among the volume control parameters (APO, Td, VSP, G and the like). Thus, the first operation representing the intention of the acceleration will be delayed so that, compared to a case in which the state after the acceleration operation (vehicle speed VSP, drive torque Td, vehicle longitudinal acceleration G) is delayed, the control is practical in that the sense of acceleration matches even more with the acceleration intention.

Further, when obtaining the delayed volume control parameter (APO') by delaying the volume control parameter (accelerator opening APO), the acceleration sound level varies as illustrated in FIG. 7 with respect to the accelerator pedal opening APO. Specifically, in the low opening degree region with a small accelerator pedal opening APO, the volume control parameter (accelerator pedal opening APO) is delayed such that a change rate of the acceleration sound level with respect to the accelerator pedal operation (acceleration operation) is small. Further, in an intermediate opening region in which the accelerator pedal opening APO is larger, the volume control parameter (accelerator pedal opening APO) is delayed such that the change rate of the acceleration sound level with respect to the accelerator pedal operation (acceleration operation) is large. Furthermore, in a high opening region in which the accelerator pedal opening APO is even more larger, the volume control parameter (accelerator pedal opening APO) is delayed such that the change rate of the acceleration sound level with respect to the accelerator pedal operation (acceleration operation) will be small.

In other words, while in the low opening region of high frequency, it is possible to eliminate the trouble of the level change of the acceleration sound or noise, in the intermediate or high opening region with an intermediate or larger accelerator pedal opening where a clear acceleration intention is present, the level change of the acceleration sound may be set larger while increasing the volume of the acceleration sound to produce or direct a feeling of acceleration.

Note that, by the setting of the acceleration sound level shown in FIG. 7, the acceleration sound level is low at the low opening region and the volume is reduced. Thus, when delaying the volume control parameter (accelerator opening APO) shown by broken line in FIGS. 2 and 3 to obtain the solid line characteristics of the volume control parameter (accelerator pedal opening APO), if, contrary to the case illustrated, the delay time Δt1 of the rising side would be set larger than the delay time Δt2 at the falling side, as described above, combined with the situation in which the acceleration sound is reduced in volume at the low opening region, the increase I volume of the acceleration sound will be slightly delayed and the production or direction of the acceleration feel will not be achieved as expected.

However, in the present embodiment, responsive to the acceleration sound level being set reduced at the low opening region, when delaying the volume control parameter (accelerator pedal opening APO) shown by broken line in FIGS. 2 and 3 to obtain the solid line characteristics, the delay time Δt1 of the rising side is set smaller as shown in the drawing than the delay time Δt2 of the falling side. Thus, even at the acceleration sound level characteristics in FIG. 7, the increase in acceleration sound volume is prevented from being slightly delayed so that the problem that the production of acceleration feeling will not be achieved as expected may be resolved.

Third Embodiment

Acceleration Sound Generation Device of the Third Embodiment

Figure 8:
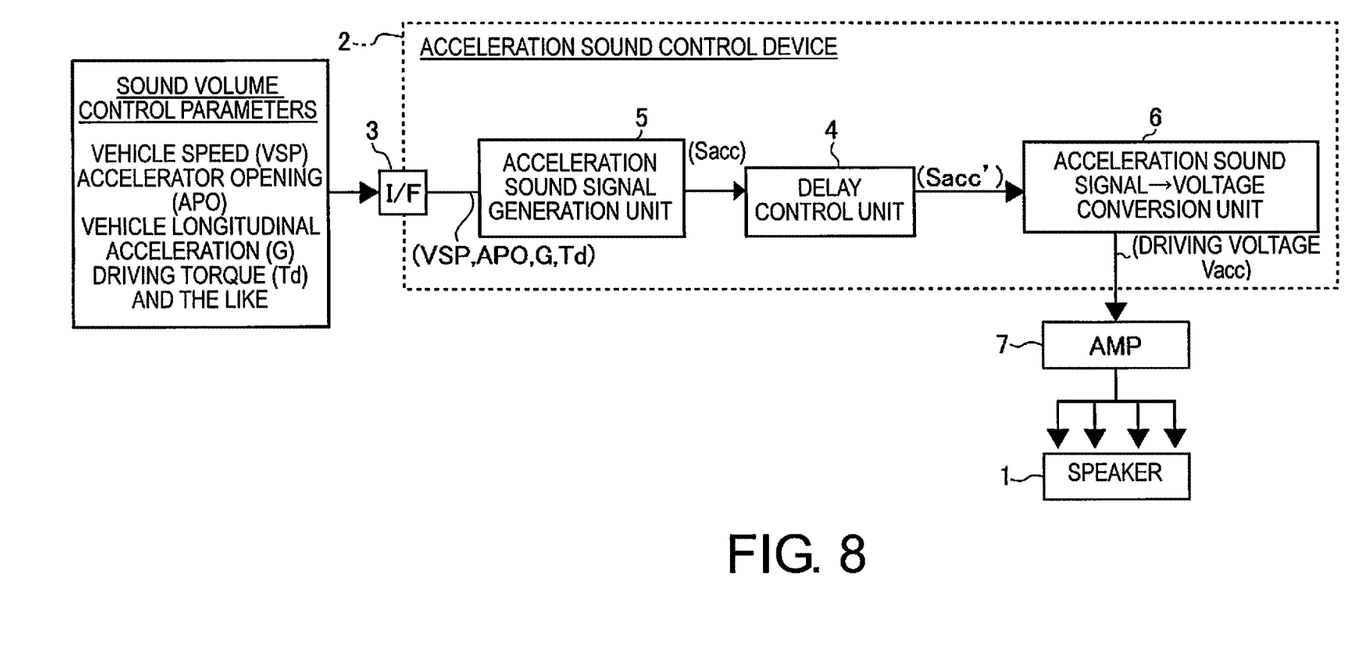
FIG. 8 is a drive control system diagram for an in-vehicle loudspeaker showing an acceleration sound generation device for a vehicle pertaining to a third embodiment according to the present invention.

FIG. 8 shows an acceleration sound generation device for a vehicle in a third embodiment according to the present invention and illustrates a control system diagram for an in-vehicle speaker 1 similar to FIG. 1, where the speaker 1 serves to add an acceleration sound in a vehicle passenger compartment for the purpose of production of acceleration feeling.

In FIG. 8, for those parts that function similarly as in FIG. 1, the same reference numerals are attached and a detailed description thereof will be omitted. Also in the present embodiment, the acceleration sound control device 2 for generating a drive signal of the in-vehicle speaker 1 controls the volume level of an acceleration sound generated by the in-vehicle speaker 1 in accordance with the acceleration degree of the vehicle.

Similarly to that in FIG. 1, the acceleration sound control device 2 uses an accelerator pedal opening APO representing an acceleration operation of the vehicle, a drive torque generated by the acceleration operation (acceleration force) Td, and a vehicle speed or vehicle longitudinal acceleration G obtained by the drive torque as a volume control parameter. However, these volume control parameters (APO, Td, VSP, G and the like) will be furnished directly to the acceleration sound signal generation unit 5 after having been received at the interface (I/F) 3 for incorporation into the acceleration sound control device 2.

These volume control parameters (APO, Td, VSP, G and the like) are either actual values or calculated values. One representative parameter is illustrated in FIG. 2 by broken line which rises in accordance with the accelerator pedal depression and falls along with the completion of the acceleration operation due to release (return) of the accelerator pedal depression.

The acceleration sound signal generation unit 5 generates an acceleration sound signal Sacc based on the volume control parameters (APO, Td, VSP, G and the like) described above. The acceleration sound signal Sacc represents a signal that increases the acceleration sound level from the speaker 1 in accordance with the vehicle acceleration degree so as to be set higher as the acceleration degree increases.

By applying a similar delay operation to the acceleration sound signal Sacc as described above in the first embodiment by the delay control unit 4, a delayed acceleration sound signal Sacc' will be generated. Thus, the delayed acceleration sound signal Sacc' represents a signal that will be adjusted in accordance with the acceleration degree of the vehicle and is raised as the acceleration degree, although the acceleration sound level from the speaker 1 is delayed to obtain the solid line in FIG. 2 with delays Δt1, Δt2 with respect to the volume control parameter (APO, Td, VSP, G and the like) as described above in the first embodiment.

The acceleration sound signal→voltage conversion unit or converter 6 converts the delayed acceleration sound signal Sacc' from the delay control unit 4 into a speaker driving voltage Vacc to supply to an amplifier (AMP) 7. The amplifier (AMP) 7 amplifies the speaker driving voltage Vacc to a level enabling to drive the speaker 1 and applies the amplified voltage to the speaker 1. The speaker 1 outputs an acceleration sound in the vehicle passenger compartment at the level shown by the solid line in FIG. 2, which corresponds to the delayed acceleration sound signal Sacc'.

The Effect of Third Embodiment

According to the acceleration sound generating device pertaining to the third embodiment described above, the acceleration sound signal Sacc obtained by the acceleration sound signal generation unit 5 from the volume control parameter (APO, Td, VSP, G and the like) is delayed by the delay control unit 4 to cause the speaker 1 to respond to the delayed acceleration sound signal Sacc' to thereby generate the acceleration sound in the vehicle passenger compartment. Thus, the acceleration sound undergoes a level change with delay as shown by solid line in FIG. 2 from the volume control parameter (APO, Td, VSP, G and the like) shown by broken line so that, at a rapid vehicle acceleration where the volume control parameter (APO, Td, VSP, G and the like) changes rapidly, the acceleration sound is prevented from being abrupt change to thereby alleviate a sense of discomfort due to a rapid change in the acceleration sound.

Moreover, the acceleration sound signal Sacc obtained at the acceleration sound signal generation unit 5 is further delayed to achieve the effect described above. Thus, comparing to the first and second embodiments in which the upstream volume control parameters (APO, Td, VSP, G and the like) are delayed, the number of the delayed targets is small (only one). Therefore, it is possible to reduce the computational load and to achieve the effects at low cost.

Fourth Embodiment

Acceleration Sound Generation Device of Fourth Embodiment

Figure 9:
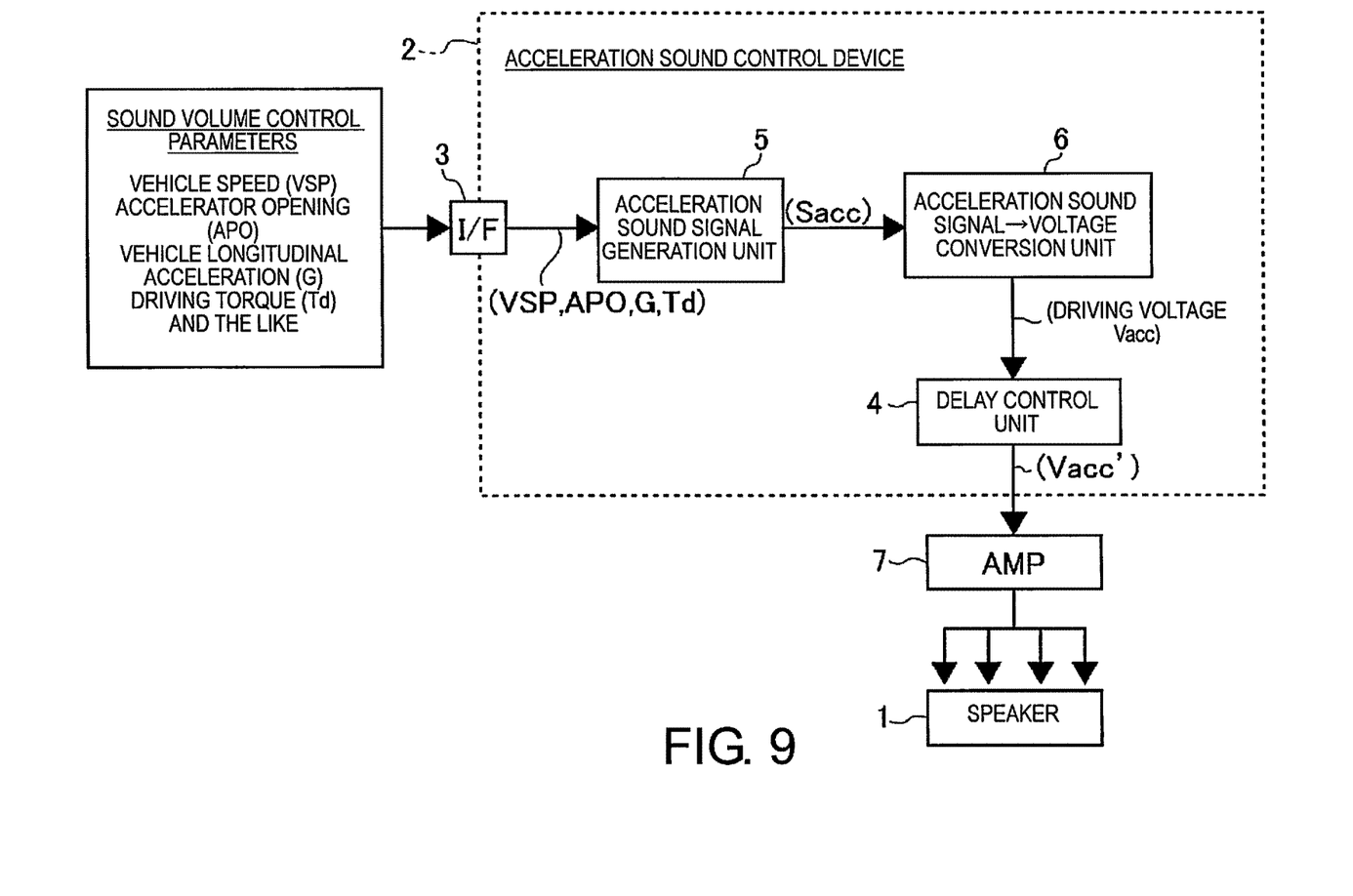
FIG. 9 is a drive control system diagram for an in-vehicle loudspeaker showing an acceleration sound generation device pertaining to a fourth embodiment according to the present invention.

FIG. 9 shows an acceleration sound generation device for a vehicle in a third embodiment according to the present invention and illustrates a control system diagram for an in-vehicle speaker 1 similar to FIG. 1, where the speaker 1 serves to add an acceleration sound in a vehicle passenger compartment for the purpose of production of acceleration feeling.

In FIG. 9, for those parts that function similarly as in FIG. 1, the same reference numerals are attached and a detailed description thereof will be omitted. Also in the present embodiment, the acceleration sound control device 2 for generating a drive signal of the in-vehicle speaker 1 controls the volume level of an acceleration sound generated by the in-vehicle speaker 1 in accordance with the acceleration degree of the vehicle.

Similarly to that in FIG. 1, the acceleration sound control device 2 uses an accelerator pedal opening APO representing an acceleration operation of the vehicle, a drive torque generated by the acceleration operation (acceleration force) Td, and a vehicle speed or vehicle longitudinal acceleration G obtained by the drive torque as a volume control parameter. However, these volume control parameters (APO, Td, VSP, G and the like) will be furnished directly to the acceleration sound signal generation unit 5 after having been received at the interface (I/F) 3 for incorporation into the acceleration sound control device 2.

These volume control parameters (APO, Td, VSP, G and the like) are either actual values or calculated values. One representative parameter is illustrated in FIG. 2 by broken line which rises in accordance with the accelerator pedal depression and falls along with the completion of the acceleration operation due to release (return) of the accelerator pedal depression.

The acceleration sound signal generation unit 5 generates an acceleration sound signal Sacc based on the volume control parameters (APO, Td, VSP, G and the like) described above. The acceleration sound signal Sacc represents a signal that increases the acceleration sound level from the speaker 1 in accordance with the vehicle acceleration degree so as to be set higher as the acceleration degree increases.

The acceleration sound signal→voltage conversion unit or converter 6 converts the acceleration sound signal Sacc from the acceleration sound signal generation unit 5 and delays into a speaker driving voltage Vacc and delays this voltage by the delay control unit 4 prior to supplying this to an amplifier (AMP) 7. By applying a similar delay operation to the speaker driving voltage Vacc as described above in the first embodiment by the delay control unit 4, a delayed speaker driving voltage Vacc' will be generated. Thus, the delayed speaker driving voltage Vacc' represents a signal that will be adjusted in accordance with the acceleration degree of the vehicle and is raised as the acceleration degree increases, although the acceleration sound level from the speaker 1 is delayed to obtain the solid line in FIG. 2 with delays Δt1, Δt2 with respect to the volume control parameter (APO, Td, VSP, G and the like) illustrated by broken line in the first embodiment.

The amplifier (AMP) 7 amplifies the speaker driving voltage Vacc' to a level enabling to drive the speaker 1 and applies the amplified voltage to the speaker 1. The speaker 1 outputs an acceleration sound in the vehicle passenger compartment at the level shown by the solid line in FIG. 2, which corresponds to the delayed acceleration sound signal Vacc'.

The Effect of the Fourth Embodiment

According to the acceleration sound generating device pertaining to the fourth embodiment described above, the speaker driving voltage Vacc corresponding to the acceleration sound signal Sacc that is obtained by the acceleration sound signal generation unit 5 from the volume control parameter (APO, Td, VSP, G and the like) is delayed by the delay control unit 4. Subsequently, the delayed speaker driving voltage Vacc' drives the speaker 1 for generating the acceleration sound in a vehicle cabin. Thus, the acceleration sound undergoes a level change with delay as shown by solid line in FIG. 2 from the volume control parameter (APO, Td, VSP, G and the like) shown by broken line so that, at a rapid vehicle acceleration where the volume control parameter (APO, Td, VSP, G and the like) changes rapidly, the acceleration sound is prevented from being abrupt change to thereby alleviate a sense of discomfort due to a rapid change in the acceleration sound.

Moreover, the driving voltage Vacc obtained at the acceleration sound signal→voltage convertor 6 is further delayed to achieve the effect described above. Thus, comparing to the first and second embodiments in which the upstream volume control parameters (APO, Td, VSP, G and the like) are delayed, the number of the delayed targets is small (only one). Therefore, it is possible to reduce the computational load and to achieve the effects at low cost.

Fifth Embodiment

Acceleration Sound Generation Device of the Fifth Embodiment

Figure 10:
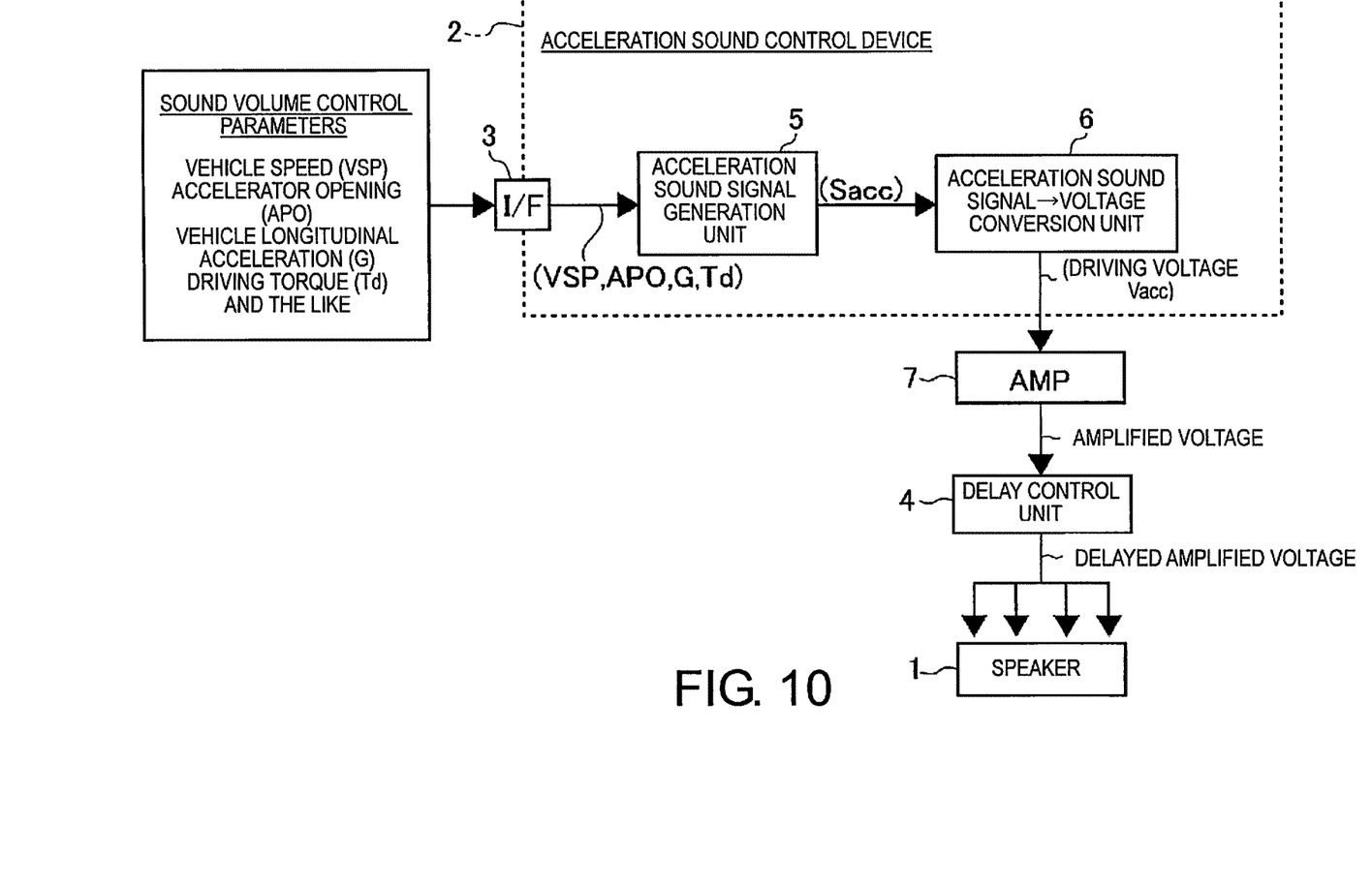
FIG. 10 is a drive control system diagram for an in-vehicle loudspeaker showing an acceleration sound generation device pertaining to a fifth embodiment according to the present invention.

FIG. 10 shows an acceleration sound generation device for a vehicle in a third embodiment according to the present invention and illustrates a control system diagram for an in-vehicle speaker 1 similar to FIG. 1, where the speaker 1 serves to add an acceleration sound in a vehicle passenger compartment for the purpose of production of acceleration feeling.

In FIG. 10, for those parts that function similarly as in FIG. 1, the same reference numerals are attached and a detailed description thereof will be omitted. Also in the present embodiment, the acceleration sound control device 2 for generating a drive signal of the in-vehicle speaker 1 controls the volume level of an acceleration sound generated by the in-vehicle speaker 1 in accordance with the acceleration degree of the vehicle.

Similarly to that in FIG. 1, the acceleration sound control device 2 uses an accelerator pedal opening APO representing an acceleration operation of the vehicle, a drive torque generated by the acceleration operation (acceleration force) Td, and a vehicle speed or vehicle longitudinal acceleration G obtained by the drive torque as a volume control parameter. However, these volume control parameters (APO, Td, VSP, G and the like) will be furnished directly to the acceleration sound signal generation unit 5 after having been received at the interface (I/F) 3 for incorporation into the acceleration sound control device 2.

These volume control parameters (APO, Td, VSP, G and the like) are either actual values or calculated values. One representative parameter is illustrated in FIG. 2 by broken line which rises in accordance with the accelerator pedal depression and falls along with the completion of the acceleration operation due to release (return) of the accelerator pedal depression.

The acceleration sound signal generation unit 5 generates an acceleration sound signal Sacc based on the volume control parameters (APO, Td, VSP, G and the like) described above. The acceleration sound signal Sacc represents a signal that increases the acceleration sound level from the speaker 1 in accordance with the vehicle acceleration degree so as to be set higher as the acceleration degree increases.

The acceleration sound signal→voltage conversion unit or converter 6 converts the acceleration sound signal Sacc from the acceleration sound signal generation unit 5 into a speaker driving voltage Vacc to supply to an amplifier (AMP) 7.

The amplifier (AMP) 7 amplifies the speaker driving voltage Vacc to a level enabling to drive the speaker 1 and, immediately directing the amplified voltage to the speaker 1, delays the amplified voltage by the delay control unit 4.

By applying a similar delay operation to the amplified voltage from the amplifier (AMP) 7 as described above in the first embodiment by the delay control unit 4, a delayed amplified voltage will be generated. Thus, the delayed amplified voltage corresponds to a voltage that will be adjusted in accordance with the acceleration degree of the vehicle and is raised as the acceleration degree increases, although the acceleration sound level from the speaker 1 is delayed to obtain the solid line in FIG. 2 with delays Δt1, Δt2 with respect to the volume control parameter (APO, Td, VSP, G and the like) illustrated by broken line in the first embodiment.

The delayed amplified voltage from the delay control unit 4 is applied to the speaker 4. The speaker 1 in turn outputs an acceleration sound in the vehicle passenger compartment at the level shown by the solid line in FIG. 2, which corresponds to the delayed amplified voltage.

The Effect of the Fifth Embodiment

According to the acceleration sound generating device pertaining to the fifth embodiment described above, the amplified voltage of the speaker driving voltage Vacc corresponding to the acceleration sound signal Sacc that is obtained by the acceleration sound signal generation unit 5 from the volume control parameter (APO, Td, VSP, G and the like) is delayed by the delay control unit 4. Subsequently, the delayed speaker driving voltage drives the speaker 1 for generating the acceleration sound in a vehicle cabin. Thus, the acceleration sound undergoes a level change with delay as shown by solid line in FIG. 2 from the volume control parameter (APO, Td, VSP, G and the like) shown by broken line so that, at a rapid vehicle acceleration where the volume control parameter (APO, Td, VSP, G and the like) changes rapidly, the acceleration sound is prevented from being abrupt change to thereby alleviate a sense of discomfort due to a rapid change in the acceleration sound.

Moreover, the driving voltage Vacc obtained at the acceleration sound signal→voltage convertor 6 is amplified by the amplifier 7 and subsequently delayed to achieve the effect described above. Thus, comparing to the first and second embodiments in which the upstream volume control parameters (APO, Td, VSP, G and the like) are delayed, the number of the delayed targets is small (only one). Therefore, it is possible to reduce the computational load and to achieve the effects at low cost.

The invention claimed is:

1. An acceleration sound generation device for a vehicle using at least one of an acceleration operation of the vehicle, an acceleration force generated by the acceleration operation, and an acceleration state obtained by the acceleration force as a control parameter, the acceleration sound generation device comprising:
    a sound generation unit configured to generate an acceleration sound in a vehicle passenger compartment in response to an acceleration sound signal that is generated based on the control parameter; and
    an acceleration sound delay unit configured to delay output of the acceleration sound by the sound generation unit such that the acceleration sound changes and is delayed with respect to a change in the control parameter, the acceleration sound delay unit being further configured to separately set a first delay time and a second delay time, the first delay time corresponding to a delay degree of the acceleration sound at a rising time of the control parameter, the second delay time corresponding to a delay degree of the acceleration sound at a falling time of the control parameter.

2. The acceleration sound generation device as claimed in claim 1, wherein
    the acceleration sound delay unit delays the acceleration sound by delaying the change in the control parameter used to generate the acceleration sound signal.

3. The acceleration sound generation device as claimed in claim 2, wherein
    the acceleration sound delay unit uses at least an acceleration operation of the vehicle as the control parameter to delay the acceleration sound by delaying the change in the acceleration operation used to generate the acceleration sound signal.

4. The acceleration sound generation device as claimed in claim 3, wherein
    the acceleration sound delay unit delays, when delaying the change in the acceleration operation, the acceleration operation so as to cause a change rate of the acceleration sound with respect to the acceleration operation to be small in a region of small acceleration operation and to hold the change rate of the acceleration sound with respect to the change in the acceleration operation in a region of large acceleration operation.

5. The acceleration sound generation device as claimed in claim 1, wherein
the acceleration sound delay unit delays the acceleration sound by delaying the acceleration sound signal used to operate the sound generation unit.

6. The acceleration sound generation device as claimed in claim 1, further comprising
an acceleration sound signal conversion unit configured to convert the acceleration sound signal into a power signal that drives the sound generation unit to generate the acceleration sound, and
the acceleration sound delay unit delays the acceleration sound by delaying the power signal used to operate the sound generation unit.

7. The acceleration sound generation device as claimed in claim 1, further comprising
the acceleration sound signal conversion unit configured to convert into a power signal, which is subsequently amplified to drive the sound generation unit to generate the acceleration sound, and
the acceleration sound delay unit delays the acceleration sound by delaying the power signal that was amplified for operating the sound generation unit.

8. The acceleration sound generation device as claimed in claim 1, wherein
the acceleration sound delay unit sets the first delay time that is the delay degree of the acceleration sound to match a response delay of the acceleration force and the acceleration state with respect to the acceleration operation.

9. An acceleration sound generation device for a vehicle using at least one of an acceleration operation of the vehicle, an acceleration force generated by the acceleration operation, and an acceleration state obtained by the acceleration force as a control parameter, the acceleration sound generation device comprising:
a sound generation unit configured to generate an acceleration sound in a vehicle passenger compartment in response to an acceleration sound signal that is generated based on the control parameter; and
an acceleration sound delay unit configured to delay output of the acceleration sound by the sound generation unit such that the acceleration sound changes and is delayed with respect to a change in the control parameter, the acceleration sound delay unit being further configured to separately set a first delay time and a second delay time, the first delay time corresponding to a delay degree of the acceleration sound at a rising time of the control parameter, the second delay time corresponding to a delay degree of the acceleration sound at a falling time of the control parameter, the acceleration sound delay unit differentiating the first delay time and the second delay time such that the first delay time is smaller than the second delay time to set the delay degree of the acceleration sound to be smaller at the rising time of the control parameter than at the falling time of the control parameter.

10. The acceleration sound generation device as claimed in claim 9, wherein
the acceleration sound delay unit delays the acceleration sound by delaying the change in the control parameter used to generate the acceleration sound signal.

11. The acceleration sound generation device as claimed in claim 10, wherein
the acceleration sound delay unit uses at least acceleration operation of the vehicle as the control parameter to delay the acceleration sound by delaying the change in the acceleration operation used to generate the acceleration sound signal.

12. The acceleration sound generation device as claimed in claim 11, wherein
the acceleration sound delay unit delays, when delaying the change in the acceleration operation, the acceleration operation so as to cause a change rate of the acceleration sound with respect to the acceleration operation to be small in a region of small acceleration operation and to hold the change rate of the acceleration sound with respect to the change in the acceleration operation in a region of large acceleration operation.

13. The acceleration sound generation device as claimed in claim 10, wherein
the acceleration sound delay unit sets the first delay time that is the delay degree of the acceleration sound to match a response delay of the acceleration force and the acceleration state with respect to the acceleration operation.

14. The acceleration sound generation device as claimed in claim 9, wherein
the acceleration sound delay unit delays the acceleration sound by delaying the acceleration sound signal used to operate the sound generation unit.

15. The acceleration sound generation device as claimed in claim 14, wherein
the acceleration sound delay unit sets the first delay time that is the delay degree of the acceleration sound to match a response delay of the acceleration force and the acceleration state with respect to the acceleration operation.

16. The acceleration sound generation device as claimed in claim 9, further comprising
an acceleration sound signal conversion unit configured to convert the acceleration sound signal into a power signal that drives the sound generation unit to generate the acceleration sound, and
the acceleration sound delay unit delays the acceleration sound by delaying the power signal used to operate the sound generation unit.

17. The acceleration sound generation device as claimed in claim 16, wherein
the acceleration sound delay unit sets the first delay time that is the delay degree of the acceleration sound to match a response delay of the acceleration force and the acceleration state with respect to the acceleration operation.

18. The acceleration sound generation device as claimed in claim 9, further comprising
the acceleration sound signal conversion unit configured to convert into a power signal, which is subsequently amplified to drive the sound generation unit to generate the acceleration sound, and
the acceleration sound delay unit delays the acceleration sound by delaying the power signal that was amplified for operating the sound generation unit.

19. The acceleration sound generation device as claimed in claim 18, wherein
the acceleration sound delay unit sets the first delay time that is the delay degree of the acceleration sound to match a response delay of the acceleration force and the acceleration state with respect to the acceleration operation.

20. The acceleration sound generation device as claimed in claim 9, wherein the acceleration sound delay unit sets the first delay time that is the delay degree of the acceleration sound to match a response delay of the acceleration force and the acceleration state with respect to the acceleration operation.

\* \* \* \* \*